(12) United States Patent
Jakobsson et al.

(10) Patent No.: US 8,375,442 B2
(45) Date of Patent: *Feb. 12, 2013

(54) AUDITING A DEVICE

(75) Inventors: Bjorn Markus Jakobsson, Mountain View, CA (US); Karl-Anders R. Johansson, Malmo (SE)

(73) Assignee: Fatskunk, Inc., Mountain View, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 12/580,891

(22) Filed: Oct. 16, 2009

(65) Prior Publication Data

US 2011/0041180 A1 Feb. 17, 2011

Related U.S. Application Data

(60) Provisional application No. 61/234,604, filed on Aug. 17, 2009.

(51) Int. Cl.
*G06F 11/00* (2006.01)
(52) U.S. Cl. .......................... 726/22; 713/193
(58) Field of Classification Search .............. 726/22, 726/23, 24, 25; 713/188, 189, 164, 193
See application file for complete search history.

(56) References Cited

U.S. PATENT DOCUMENTS

| | | | |
|---|---|---|---|
| 5,812,483 A | 9/1998 | Jeon et al. | |
| 7,315,826 B1 | 1/2008 | Guheen et al. | |
| 7,967,215 B2 | 6/2011 | Kumar et al. | |
| 8,118,218 B2 | 2/2012 | Koh et al. | |
| 2003/0145228 A1* | 7/2003 | Suuronen et al. | 713/201 |
| 2005/0097094 A1 | 5/2005 | Silverbrook et al. | |
| 2005/0188218 A1 | 8/2005 | Walmsley et al. | |
| 2006/0219776 A1 | 10/2006 | Finn | |
| 2008/0034406 A1 | 2/2008 | Ginter et al. | |
| 2008/0098457 A1* | 4/2008 | Carter | 726/2 |
| 2008/0129450 A1 | 6/2008 | Riegebauer | |
| 2008/0229415 A1 | 9/2008 | Kapoor et al. | |
| 2009/0109959 A1 | 4/2009 | Elliott et al. | |
| 2009/0199206 A1 | 8/2009 | Finkenzeller et al. | |
| 2010/0216434 A1 | 8/2010 | Marcellino et al. | |
| 2010/0291896 A1 | 11/2010 | Corda | |
| 2010/0323678 A1 | 12/2010 | Corda et al. | |

OTHER PUBLICATIONS

Arvind Seshadri , Adrian Perring Lenndert Van Doorn, Using Software-based Attestation for Verifying Embedded Systems in Cars IEEE 2004; 4 Pages.*
Dennis K. Nilsson; "A Framework for Self-Verification of Firmware Updates over the Air in Vechile ECUs"; IEEE 2008.; pp. 1-5.*
Castelluccia et al., On the Difficulty of Software-Based Attestation of Embedded Devices. Proceedings of the 16th ACM Conference on Computer and Communications Security (CCS), 2009.
Choi et al., Proactive Code Verification Protocol in Wireless Sensor Network. In ICCSA (2), pp. 1085-1096, Aug. 26-29, 2007. Cover sheet is from Computational Science and Its Applications—ICCSA 2007.
C.Dwork et al., On Memory-Bound Functions for Fighting Spam. In Crypto, pp. 426-444. Springer-Verlag, 2002.
Ferguson et al., The Skein Hash Function Family, Version 1.2, Sep. 15, 2009.

(Continued)

*Primary Examiner* — Samson Lemma
(74) *Attorney, Agent, or Firm* — Van Pelt, Yi & James LLP

(57) ABSTRACT

Auditing a device is disclosed. One or more hardware parameters that correspond to a hardware configuration is received. A sequence of modifications to the physical memory is performed. Results are provided to a verifier. Optionally, once it is determined that no evasive software is active in the physical memory, a scan is performed.

18 Claims, 8 Drawing Sheets

OTHER PUBLICATIONS

Garay et al., Software Integrity Protection using Timed Executable Agents. In ASIACCS '06: Proceedings of the 2006 ACM Symposium on Information, Computer and Communications Security, pp. 189-200, New York, NY, USA, 2006. ACM.

Gardner et al., On the Difficulty of Validating Voting Machine Software with Software. In EVT'07: Proceedings of the USENIX Workshop on Accurate Electronic Voting Technology, pp. 11-11, Berkeley, CA, USA, 2007. USENIX Association.

Gratzer et al., Alien vs. Quine, The Vanishing Circuit and Other Tales from the Industry's Crypt, IEEE Security and Privacy, 5(2):26-31, 2007.

Gu et al., Remote Attestation on Program Execution. In STC '08: Proceedings of the 3rd ACM Workshop on Scalable Trusted Computing, pp. 11{20, New York, NY, USA, Oct. 31, 2008. ACM.

Fritz Hohl, Time Limited Blackbox Security: Protecting Mobile Agents from Malicious Hosts, 1998.

Jakobsson et al., Assured Detection of Malware with Applications to Mobile Platforms. In DIMACS Technical Report 2010-03, Feb. 2010.

Jakobsson et al., Server-Side Detection of Malware Infection. In New Security Paradigms Workshop (NSPW), Sep. 8-11, 2009.

Kennell et al., Establishing the Genuinity of Remote Computer Systems. In SSYM'03: Proceedings of the 12th Conference on USENIX Security Symposium, pp. 21{21, Berkeley, CA, USA, 2003. USENIX Association.

Monrose et al., Distributed Execution with Remote Audit. In Proceedings of the 1999 ISOC Network and Distributed System Security Symposium, pp. 103-113, 1999.

Rivest et al., The MD6 hash function—A Proposal to NIST for SHA-3. Submission to NIST, Feb. 20, 2009.

Scandariato et al., Application-Oriented Trust in Distributed Computing. In Third International Conference on Avail- ability, Reliability and Security, (ARES 08), pp. 434-439, 2008.

Schellekens et al., Remote Attestation on Legacy Operating Systems with Trusted Platform modules. In Science of Computer Programming, pp. 13-22, 2008.

Seshadri et al., SAKE: Software Attestation for Key Establishment in Sensor Networks. pp. 372-385. 2008.

Seshadri et al., SCUBA: Secure Code Update by Attestation in Sensor Networks. In WiSe '06: Proceedings of the 5th ACM Workshop on Wireless Security, pp. 85-94, New York, NY, USA, Sep. 29, 2006. ACM.

Seshadri et al., Pioneer: Verifying Code Integrity and Enforcing Untampered Code Execution on Legacy Systems. In SOSP '05: Proceedings of the Twentieth ACM Symposium on Operating Systems Principles, pp. 1-16, New York, NY, USA, Oct. 23-26, 2005. ACM Press.

Seshadri et al., SWATT: SoftWare-Based ATTestation for Embedded Devices. In Proceedings of the IEEE Symposium on Security and Privacy, 2004.

Seshadri et al., Using Software-Based Attestation for Verifying Embedded Systems in Cars, 2004 Embedded Security in Cars Workshop (Escar 2004), 2004.

Shaneck et al., Remote Software-Based Attestation for Wireless Sensors. In ESAS, pp. 27-41, 2005.

Shankar et al., Side Effects are not Sufficient to Authenticate Software. In in Proceedings of the 13th USENIX Security Symposium, pp. 89-101, Aug. 2004.

Shi et al., Bind: A Fine-Grained Attestation Service for Secure Distributed Systems. In SP '05: Proceedings of the 2005 IEEE Symposium on Security and Privacy, pp. 154-168, Washington, DC, USA, 2005. IEEE Computer Society.

Yang et al., Distributed Software-Based Attestation for Node Compromise Detection in Sensor Networks. In SRDS '07: Proceedings of the 26th IEEE International Symposium on Reliable Distributed Systems, pp. 219-230, Washington, DC, USA, 2007. IEEE Computer Society.

Bickford et al., Rootkits on Smart Phones: Attacks and Implications, Copyright 2009, ACM 978-1-60558-431, Jul. 9, 2009.

\* cited by examiner

```
for i:=1 to rounds
  for k:=0 to chunks_per_block -1
    permutation[1 number_blocks] := get_permutation
    for j:= 1 to number_blocks
      modify_memory(permutation[j]*chunks_per_block+k, next_string_chunk)
```

AUDITING A DEVICE

CROSS REFERENCE TO OTHER APPLICATIONS

This application claims priority to U.S. Provisional Patent Application No. 61/234,604 entitled DETECTION OF MALWARE filed Aug. 17, 2009 which incorporated herein, in its entirety, by reference for all purposes.

BACKGROUND OF THE INVENTION

Existing techniques for detecting the presence of unauthorized programs are typically resource-intensive. For example, they generally require constant updates (e.g., of blacklists) and periodic or continuous scans for problems. The situation is exacerbated if the device being protected by such techniques has limited resources, such as limited memory, or by being powered by a battery. As one example, a device with limited resources may not be able to store definitions for detecting all known unauthorized programs. As another example, scanning for unauthorized programs is typically a power-intensive act, and may quickly deplete the battery of a battery-powered device. In some environments, a central authority is used to facilitate the discovery of unauthorized programs. One drawback of this approach is that it typically requires that the device being protected compile detailed logs of device activities. Generating such logs is resource-intensive (e.g., requiring large amounts of disk storage; processing power to assemble the log data; and the bandwidth to deliver the log data to the central authority) and can also present privacy problems.

Existing techniques for detecting the presence of unauthorized programs are also generally vulnerable to attempts by such programs to cause incorrect reporting. For example, a rootkit can "listen in" to requests by applications to the operating system, and may modify these requests and their responses. If an application requests information about what processes are running, a malicious rootkit application can avoid detection by removing information about itself from the report that is returned by the operating system.

Existing techniques for screening against the installation or execution of unauthorized programs are also known to be vulnerable to new instances of malware that may not immediately be detectable due to a lack of information about their structure and functionality. Therefore, and irrespective of the resources available to the device, if the unauthorized program is sufficiently sophisticated and/or has not previously been encountered, it can evade detection and cause undetected harm. And, if the unauthorized program has intentionally been installed by the user to bypass detection (e.g., to facilitate software piracy), traditional techniques may fail to locate the unauthorized program, or any other unauthorized activities.

BRIEF DESCRIPTION OF THE DRAWINGS

Various embodiments of the invention are disclosed in the following detailed description and the accompanying drawings.

FIG. 7 illustrates an example of pseudo code for use in conjunction with auditing a device.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
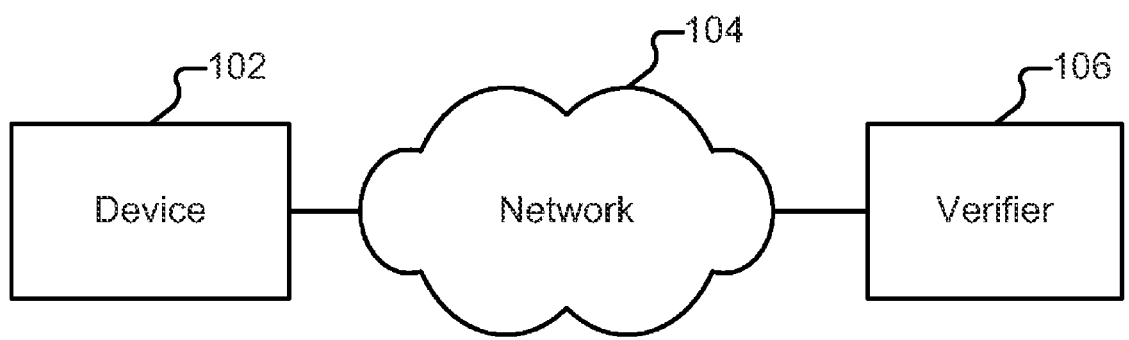
FIG. 1 illustrates an embodiment of an environment in which device auditing is provided.

FIG. 1 illustrates an embodiment of an environment in which device auditing is provided. In the example shown, device 102 is a cellular telephone. Device 102 is in communication (e.g. via network 104) with verifier 106. For example, in the example shown in FIG. 1, device 102 communicates with verifier 106 via a 3G network. Verifier 106 is under the control of a carrier, such as a provider of telephony service to device 102. Verifier 106 includes a database of hardware configuration information, including an entry corresponding to device 102 and the amount of RAM included on device 102.

As will be explained in more detail below, device 102 can be audited such that any evasive programs (e.g., malware) present on the device can be detected and/or removed through the undertaking a sequence of modifications to physical memory included on device 102. Results associated with the performance of the memory modifications are verified by verifier 106. In some embodiments, once device 102 is determined to be free of influence of such evasive programs, additional scans are performed, which are also described in more detail below. For example, in addition to detecting malware (e.g., software installed without a user's knowledge and/or consent), the techniques described herein can detect "jailbreaking" actions (e.g., privilege escalations) taken by the user, such as to circumvent digital rights management installed by a carrier or hardware manufacturer.

A variety of devices can be used in conjunction with the techniques described herein. For example, in some embodiments device 102 is a video game console. The video game console is configured to communicate with a verifier under the control of the manufacturer of the game console via the Internet (104). If the owner of device 102 makes an unauthorized change to device 102 (e.g., by using a modification chip), verifier 106 will be able to detect the modification accordingly.

Other examples of devices that can be used in conjunction with the techniques described herein include desktop computers, notebook computers, netbooks, personal digital assistants, video playback devices (e.g. televisions, DVD players, portable video players), settop boxes, medical devices, and virtually any other device that includes a processor and a memory.

In various embodiments, verifier 106 is controlled by a user of device 102, instead of by a separate entity. For example, a desktop computer owned by the user of device 102 can be configured to provide verification services to device 102. In that scenario, device 102 can be configured to communicate with the verifier via a local network. Device 102 can also be configured to communicate with verifier 106 directly (e.g., via a dedicated cable) and network 104 is omitted as applicable.

In some embodiments a verifier is collocated with or otherwise directly coupled to device 102. For example, a subscriber identity module ("SIM") card inserted into a cellular phone can be configured to provide the functionality of verifier 106 to the cellular phone. As another example, the functionality of verifier 106 can be integrated into a power cord used to charge a cellular phone. In such embodiments, an external verifier can either be omitted, or can be used in addition to the verification services provided by the collocated/coupled verifier. As one example, suppose device 102 is a personal video player with integrated WiFi capabilities. A power cord used to charge the device can be configured to provide verification services to the device each time it is charged. In addition, if the WiFi radio is active, the device can be configured to communicate periodically with a verifier provided by the manufacturer of the device. As another example, a verifier 106 can be included on a USB device that is periodically inserted by a user into a laptop 102. In addition, whenever a user of laptop 102 attempts to conduct banking transactions with an online bank, the bank can also provide verification services to the laptop 102 prior to granting access to the user's account. As yet another example, a network operator or service provider can require a user to have his or her machine audited before he or she is allowed on the network or allowed to access a service. User can also initiate an audit, for example, after realizing that he or she has been exposed to a potentially risky situation. One way a user can initiate an audit is to select a menu option on the device. Another example ay is for the user to request an audit from verifier 106 (e.g., by submitting an online request through a web form).

Figure 2:
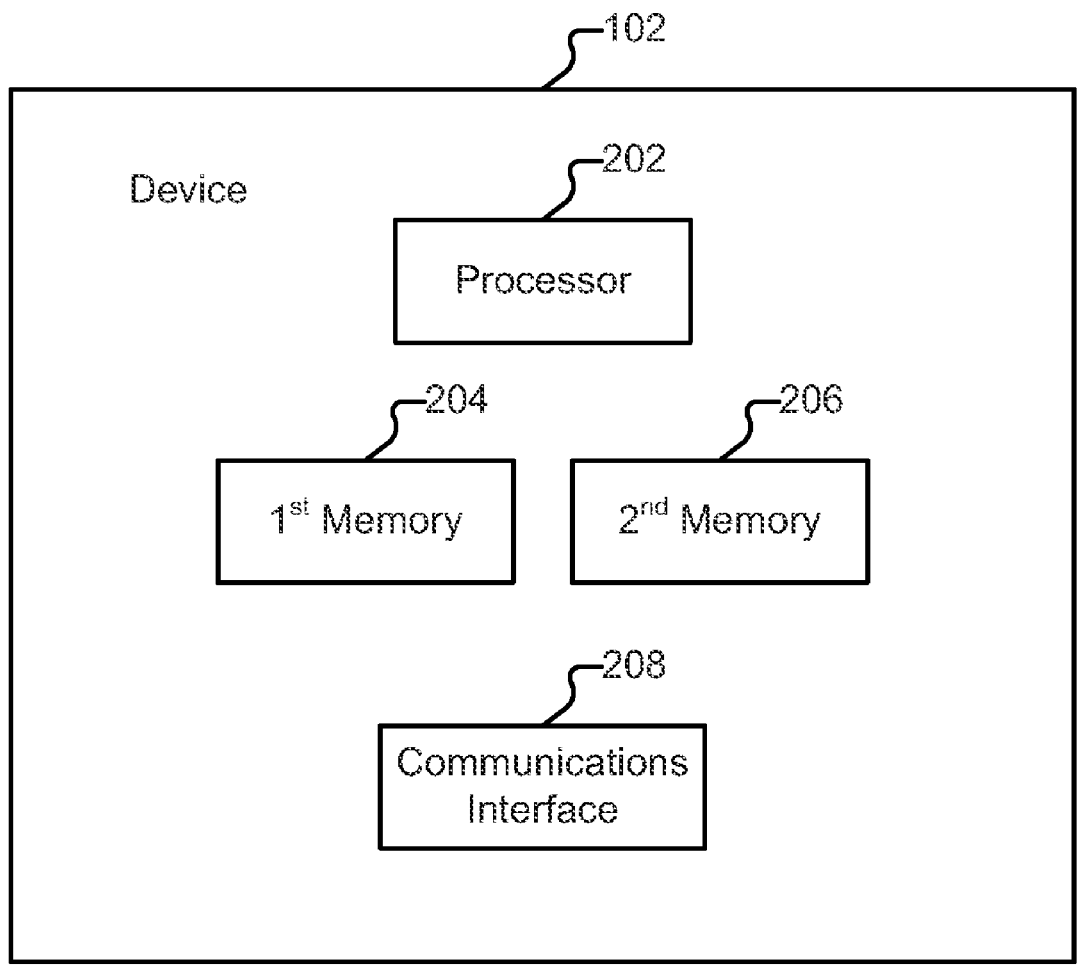
FIG. 2 illustrates an embodiment of a device.

FIG. 2 illustrates an embodiment of a device. In the example shown, device 102 includes a processor 202, a first memory 204, a second memory 206, and a communications interface 208. As one example, device 102 includes a 528 Mhz ARM processor (202), 128 MB of RAM (204), a micro SD card slot into which a user has inserted a 1 GB micro SD card (206), and a 3G modem (208). Memory 204 is also referred to herein as "fast" memory. Memory 206 is also referred to herein as "slow" memory. However, memories 204 and 206 need not be different speeds. Other components may also be included in device 102, such as a GPS receiver (not shown). Elements, such as second memory 206, may also be omitted as applicable.

Using the auditing techniques described herein, the absence of active processes in fast memory can be verified. And, after that verification has been completed, all memory (e.g., both fast and slow) can be scanned to identify, classify, report and potentially modify the contents of the fast and slow memory, or portions thereof. The distinction between fast and slow memory can be made in a variety ways. For example, on a device with RAM, flash memory and a hard drive, it is possible to treat only the RAM as fast memory and flash memory and the hard drive as slow memory. It is also possible to treat both the RAM and the flash memories as fast memory and the hard drive as slow memory. It is also possible to consider all memory physically located on a given device as being fast, and all external memory accessible (or potentially accessible) by the device as slow. The turnaround time to communicate to external components will cause such external accesses to be slower, irrespective of the type and actual local access speed of the external memory. Depending of what types of memory are treated as fast vs. slow, the selection of parameters would be done accordingly.

As will be described in more detail below, the existence of unauthorized modifications to device 102 can be detected by configuring device 102 to run a series of modifications to memory 204 and examining the results. If for example, the time it takes to perform the modifications exceeds a tolerance of a predetermined length of time, or if a result determined in conjunction with the modifications does not match an expected result, the presence of an evasive program may be indicated. In various embodiments, the memory modifications are performed across all memory on a device (e.g. both memory 204 and memory 206), instead of being run only on fast memory such as memory 204.

Figure 3:
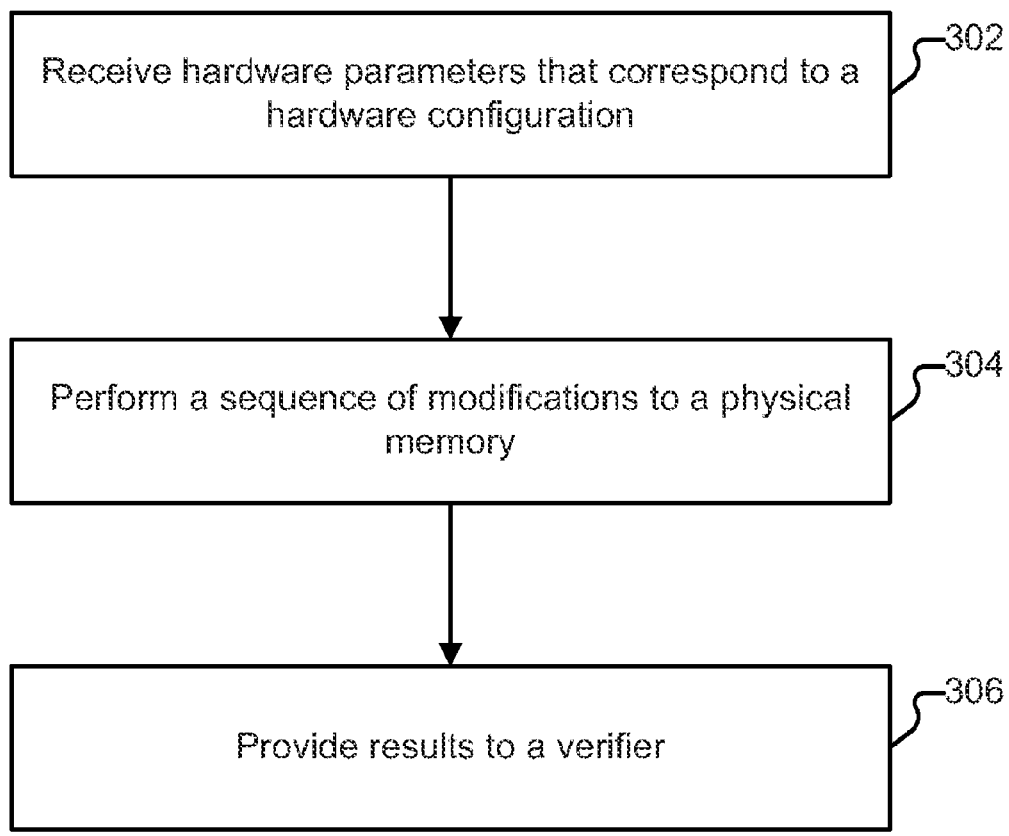
FIG. 3 illustrates an embodiment of a process for performing a device audit.

FIG. 3 illustrates an embodiment of a process for performing a device audit. In various embodiments, the process shown in FIG. 3 is performed by device 102. The process shown in FIG. 3 can be initiated in a variety of ways. For example, the process can be initiated every time the user charges the device (e.g., by configuring the device to initiate the process when it detects a power supply). The process can also be initiated in response to the occurrence of a particularly large or unusual transaction, in response to a concern that the user is at risk (e.g., in response to the carrier receiving notification that a new vulnerability has been released by a nefarious individual), in response to the elapsing of a certain amount of time, etc. Additional examples of events that can trigger the initiation of the process shown in FIG. 3 include an attempt by the user of device 102 to make a payment or otherwise engage in a financial transaction, an authentication attempt (e.g., the user of the device attempting to access to a bank account), and an access request being performed (e.g., a request for the download of a movie to the device).

The process begins at 302 when one or more hardware parameters that correspond to a hardware configuration is received. Example hardware parameters include the amount and the speed of fast memory 204. For example, in the case of the device shown in FIG. 2, the hardware parameters would include "amount=128M" and "speed=300 Mhz."

The hardware parameters can be received in a variety of ways. As one example, the SIM of a cellular phone can be configured to detect the amount and speed of installed memory. As another example, if a proprietary cable is used to connect device 102 to a power source (or to a computer or other device), the parameters may be known (and thus "received") by virtue of the cable only working in conjunction with a device having a specific amount and speed of memory. As yet another example, a serial number of a device may indicate the amount and speed of fast memory 204 installed on a device. In various embodiments, the user (or a representative thereof) is requested to input memory parameters in a web form or a configuration file. Assumptions can also be made about the likely memory configuration of the device and a benchmarking program can be run to confirm whether the assumption is likely to be correct.

At 304, a sequence of modifications to a physical memory is performed. Examples of ways in which such modifications can be performed are described in more detail below. In some embodiments the sequence of modifications to be performed is determined by the verifier. The set of modifications to be made can be provided to the device in a variety of ways. For example, the sequence can be pre-loaded onto the device at time of manufacture, at time of delivery to the supplier or carrier, or at the time of purchase. It can also be loaded by user choice or by a service provider at any time after purchase (e.g., as an over-the-update or as a firmware update), or when needed to perform an audit. The parameterization can be performed by the manufacturer or supplier or carrier, given known specifications. It can also be performed through a lookup, e.g., of serial number, by a user or service provider. The parameters can be associated with the model or device name. If the device is reconfigured, e.g., by replacement or addition of components, then these new components can carry information about the new or additional parameterization. The components can also carry the entire set of instructions, instead of just the parameters. Alternatively, the serial numbers, names, or types of components can indicate the needed change in parameters. If it is believed that the client device is secure at the time of installation of the algorithm or a new component, then the client machine can also inquire what components are installed (as is typically done as a system is booted up), and set the parameters accordingly.

In various embodiments, device manufacturers offer to preload non-activated auditing software at no cost, and later request payment to activate auditing services (and/or the additional scanning services described in more detail below. The auditing software can subsequently be activated by carriers, on request by end users or service providers. The carrier collects payment for the activation and optionally forwards portions of the payment to the handset manufacturer, providers of auditing software, providers of additional scanning software (e.g., antivirus detection services), and any other parties involved in the transaction.

At 306, one or more results of the portion of the process performed at 304 are reported to a verifier. As will be described in conjunction with FIG. 5, in some embodiments multiple iterations of modifications to the memory and communications with the verifier are made, and the processes shown in FIGS. 3 and 4 are adapted accordingly.

Figure 4:
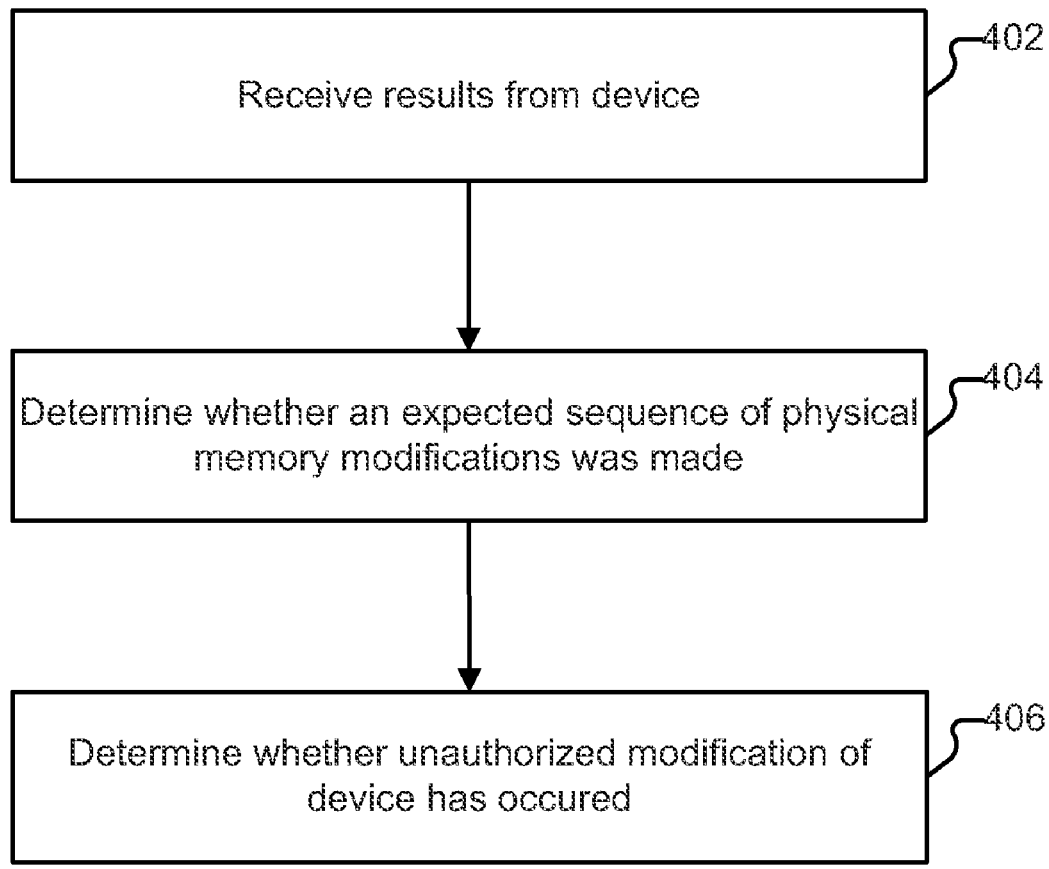
FIG. 4 illustrates an embodiment of a process for performing a device audit.

FIG. 4 illustrates an embodiment of a process for performing a device audit. In various embodiments, the process shown in FIG. 4 is performed by verifier 106. As explained above, in some embodiments the process shown in FIG. 4 is performed by an entity separate from device 102 (such as on a verifier controlled by a carrier). In other embodiments the process is performed by a verifier located on or otherwise physically coupled to device 102.

The process begins at 402 when results are received. For example, when device 102 reports results at 306, those results are received by a verifier at 402.

At 404, a determination is made as to whether the results received at 404 indicate that an expected sequence of physical modifications was made. Verifier 106 is configured with information such as the amount of time the execution of a sequence of memory modifications should take on device 106 (assuming no authorized modifications have been made). In some embodiments verifier 106 is also be configured to store additional information, such as seed values and the results of computations performed by device 102.

If the expected sequence of physical memory modifications is determined to have been made (e.g., device 106 performed the sequence of memory modifications), it is concluded (406) that no unauthorized modifications have been made to the device. And, any evasive processes that might previously have been active on device 102 have been neutralized. If the expected sequence of physical memory modifications is determined to have not been made (e.g., because the amount of time to perform the sequence is off, or computed results are incorrect), it is concluded (406) that an unauthorized modification has been made to the device. (e.g., that an evasive process is present on the device and is attempting to avoid detection).

Figure 5A:
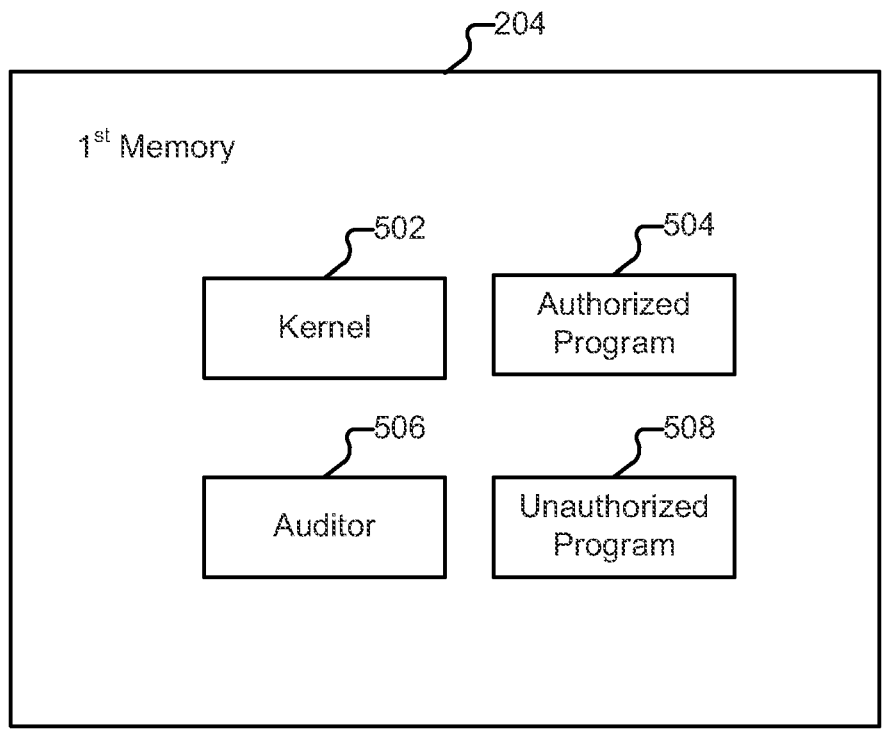
FIG. 5A illustrates a representation of a memory prior to an execution of the process shown in FIG. 3.

FIG. 5A illustrates a representation of a memory prior to an execution of the process shown in FIG. 3. In the example shown, kernel 502, authorized program 504, unauthorized program (e.g., a malware agent) 508, and an auditor program 506 are loaded in RAM. Typically, in order to remain resident on a device, an evasive program needs to do one of two things. It must either remain active in RAM (or swap space), or it must modify a legitimate program, data, or configuration of the device to allow the malware agent to gain control after a scan has been performed. As will be explained in more detail below, using the techniques described herein, the presence of the malware agent can be detected, irrespective of the techniques it employs to evade detection. In addition, using the techniques described herein, the presence of the malware agent can be detected even if auditor 506 is loaded after malware agent 504.

Figure 5B:
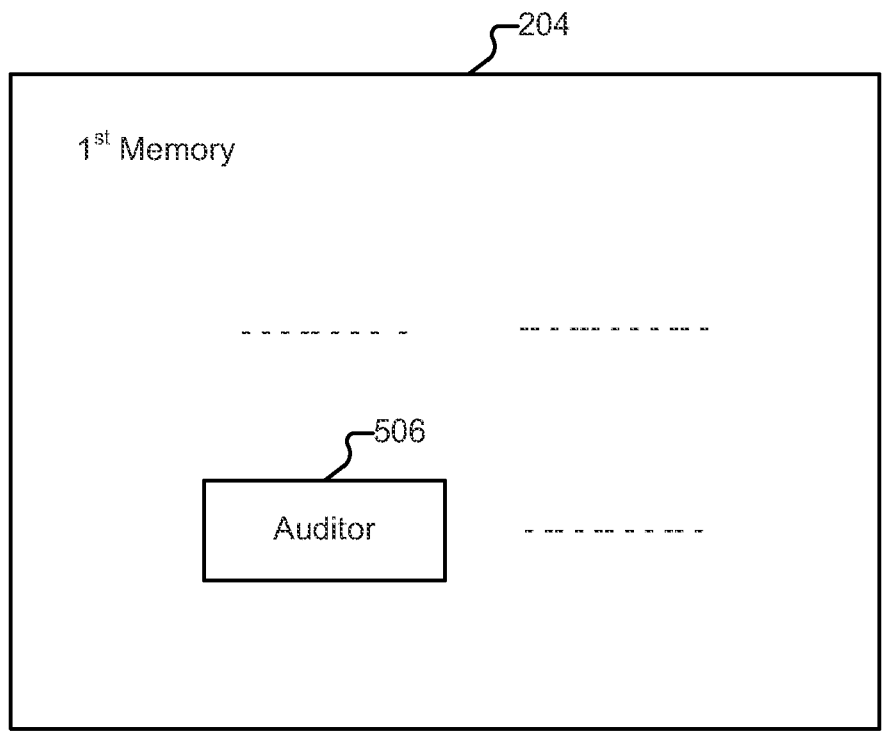
FIG. 5B illustrates a representation of a memory while the process shown in FIG. 3 is occurring.

FIG. 5B illustrates a representation of a memory while the process shown in FIG. 3 is occurring. As will be explained in more detail below, auditor 506 is configured to clear memory RAM (and any swap space) except for the space used by auditor 506. In various embodiments, a minimalistic set of other services is also permitted to occupy RAM. For example, if device 102 supports 3G communications, the area of RAM occupied by a 3G driver/module is not cleared, so that auditor 506 can use the 3G modem to communicate with verifier 106. As another example, in some embodiments a microkernel is permitted to occupy a portion of RAM while auditor 506 clears the remainder of the RAM.

Figure 6:
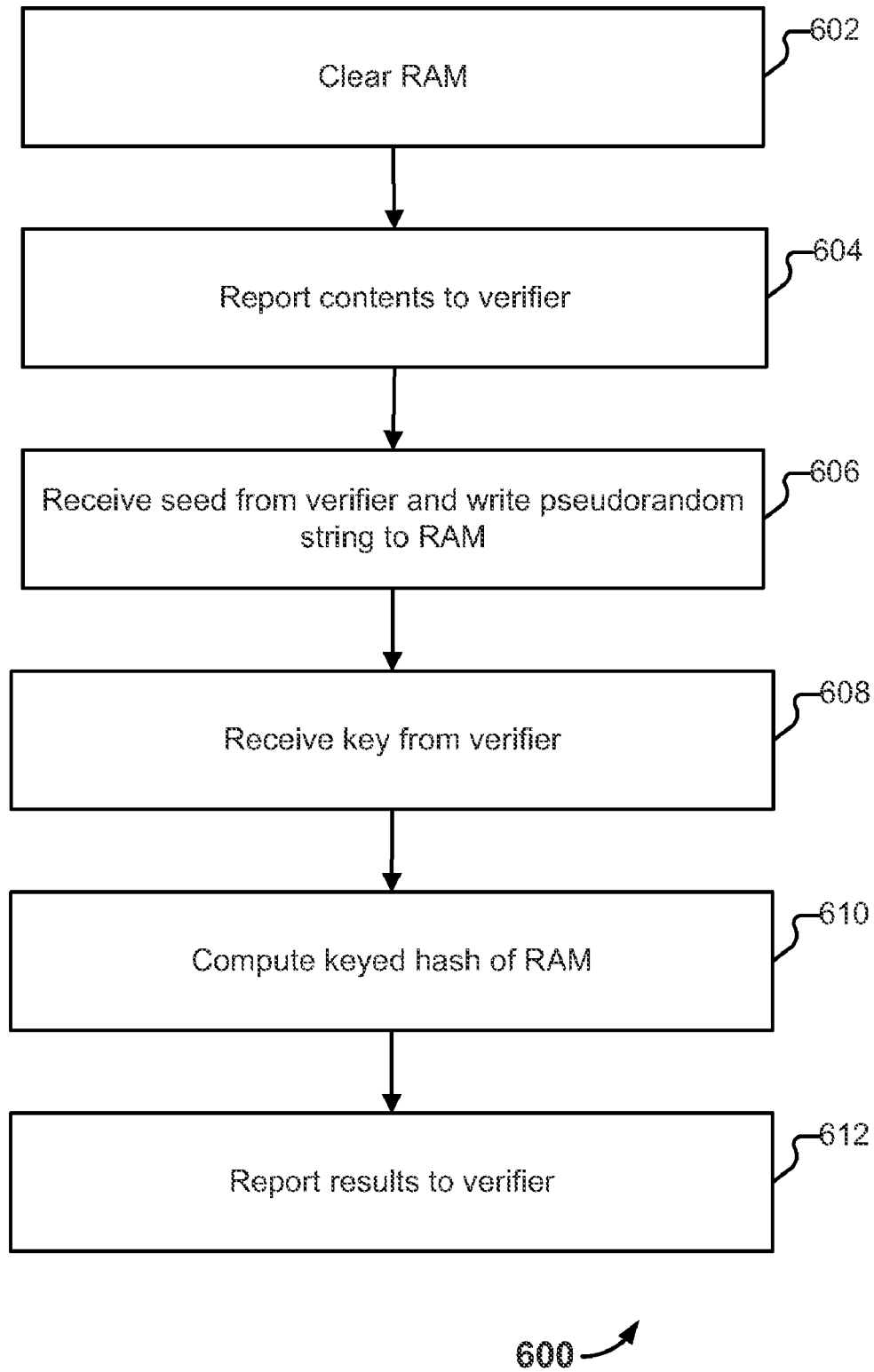
FIG. 6 illustrates an embodiment of a process for performing a device audit.

FIG. 6 illustrates an embodiment of a process for auditing a device. The process begins at 602 when an auditor process running on device such as device 102 clears all portions of memory 204 (and any swap space) that is not claimed for use by the auditor. In some embodiments, this includes unloading the kernel, various drivers, and all other processes. In various embodiments, the unclaimed memory space is overwritten by a sequence instead of being cleared (e.g., with zeros). One example sequence is a pseudo-random sequence that is combined with the original memory contents, such as by using the XOR operation. This allows the unclaimed memory space to later be reconstituted by the repeated combination with a pseudo-random sequence that complements or equals the previously used pseudo-random sequence. The unclaimed memory space can also be overwritten with contents in a way that clears it, but which does not correspond to the typical erasing operation of the device. For example, it is possible to clear unclaimed memory by writing a sequence of 01010101 to it, or any other appropriate sequence.

In some embodiments, the auditor code comprises two components: a loader and a variable algorithm segment. The task of the loader is to load algorithm segments from non-RAM storage (e.g., something other than memory 204), and hand over control to the loaded algorithm segment. After an algorithm segment has completed, it hands back the control to the loader.

At 604, contents of memory 204 are reported to verifier 106. In some embodiments the entire contents are reported. In other embodiments, only descriptions of changes since the last audit are communicated.

At 606, the device receives a cryptographic seed from the verifier. The seed is expanded to a pseudorandom string and the string is written to RAM. An example technique for writing a string to RAM in accordance with portion 606 of process 600 is provided below.

At 608, the device receives a cryptographic key from the verifier.

At 610, the device uses the received key to compute a keyed hash of the entire contents of the device's RAM.

At 612, the device reports the resulting value to the verifier. Verifier 106 evaluates the results, e.g., according to the process shown in FIG. 4.

In various embodiments, device 102 reports state information from computations at 606 and 610 at time intervals set by verifier 106. The use of such intervals provides assurance that the computations performed by device 102 are being performed within memory 204 (and not, e.g. a portion of memory 206).

Device 102 obtains updates, from verifier 106, of the seed and respective key on an as-needed basis. The use of updates provides assurance that device 102 is not outsourcing computation to an external fast resource. For example, in order to outsource the computation, an evasive program would have to forward the seed and key updates to the external device, which would introduce a measurable delay.

Verifier 106 verifies that both the final function value and partial results are correct and are reported by device 102 to the verifier within acceptable time bounds. An example technique for evaluating the time it takes an auditor to perform its tasks is provided below. As mentioned above, in some embodiments verifier 106 is external to device 102 and is operated by a party other than the owner of the device. In other embodiments, verifier 106 is under the control of the user of device 102.

After the process shown in FIG. 6 has been completed, auditor 506 can restore the contents of the device, whether fully or partially, and return control to previously active processes or to a process performing further scans of memory contents. The contents of the fast memory can be restored if they were swapped out to slow memory prior to the execution of the timed computation, or if the original contents were combined with a string, the latter allowing a similar combination to be performed, thereby recovering the previous state. It is also possible to restart the device by loading a "starting" state. It is further possible to first hand over control to a process that scans, reviews, reports and modifies the contents of memory, or any subset of these operations (described in more detail below). The reporting can be presented to verifier 106, or to a third party, such as one in charge of managing the processing of memory contents. In the latter case, verifier 106 may be in charge of assuring that there is no active malicious process, and the second verifier could be in charge of processing the memory of the device to determine whether it complies with a particular policy, which may be related to malware detection, digital rights management, or another policy identifying what device memory contents are desirable.

Example Adversarial Strategies

In order for an evasive program to avoid being detected, e.g., during portion 604 of the process shown in FIG. 6, it must be active in RAM, either as a unique process (504) or as part of a corrupted version of auditor 506. The following are four example ways in which an evasive program such as malware agent 504 can attempt to remain active:

Strategy 1: Outsource Storage.

The malware agent can stay active in RAM and attempt to remain undetected by causing auditor 106 to not clear the appropriate space (e.g., at 602) and rely on non-RAM storage or external storage to store the corresponding portion of the pseudo-random string generated at 606. The computation at 610 would then be modified to use the outsourced storage instead of the space where the malware agent resides.

Strategy 2: Compute Missing Data.

Instead of outsourcing storage of portions of the pseudo-random string, the malware agent can store a modified representation of the string (e.g., a compressed version, or a version that is missing portions), and reconstitute relevant portions of the string as they are needed during the computation of the keyed hash at 610. Since the malware agent has the seed from which the pseudo-random string is generated, it can use this—or later states of the pseudo-random generator—to regenerate required portions of data.

Strategy 3: Outsource Computation.

The malware agent can forward relevant data to an external device (assuming the necessary communications infrastructure, such as a WiFi connection is still enabled). The external device receives data from device 102 and computes the values needed to report to verifier 106, feeding these values to the malware agent on device 102.

Strategy 4: Modify Detection Code.

The malware agent can attempt to replace the code of auditor 506 with modified code. This replacement code may be designed to suppress reports of compromised memory contents, or contain a hook for malware code to be loaded after the audit completes. The can attempt to incorporate such changes to auditor 506 without taking up more space by swapping out or compressing portions of the auditor code and loading or unpacking it again as it is needed.

Filling Fast Memory

This section describes an example technique that can be used in conjunction with portion 606 of the process shown in FIG. 6.

FIG. 7 illustrates an example of pseudo code for use in conjunction with auditing a device. In the example shown, the subroutine get_permutation returns a vector indicating a random permutation of number_blocks items, ranging from 0 to number_blocks−1, where number_blocks is the number of portions of size equal to a flash block that the RAM comprises, minus those needed by the auditor. The subroutine next_string_chunk returns a pseudo-randomly generated chunk of bits; the term chunk is used to refer to the amount of data that can be sent on the memory bus. As one example, for an Android G1 phone, a chunk is 32 bits.

Both get_permutation and next_string_chunk use the most recently provided seed as input. The pseudo-random string can be computed as $segment_i \leftarrow hash(segment_{i-1})$, i.e., in a way that cannot be computed using random access. One example is a function based on iterated application of the hash function, given the non-homomorphic properties of hash functions. A variety of hash functions may be used. One example is MD6 in 512-bit mode.

The constant rounds is the number of times a pseudo-random chunk is XORed into the contents of a cell, using the function modify_memory. The choice of rounds controls the amount of work an adversary has to perform to carry out the second adversarial strategy (computing missing data), while also incurring an increasing cost to the honest execution of the algorithm for large values. In the example shown, rounds=2, which results in a noticeably greater cost to the adversary than rounds=1, since the value of each cell will come to depend on two other cells. This can confound memory management strategies of an adversary. In the example shown, chunks_per_block is the number of chunks contained in a flash block, equaling 32768 (=128 kB/32 bits) for an example G1 phone, while number_blocks=1024 (=128 MB/128 kB).

The function modify_memory(pos, string) XORs the contents of position pos with the value string, where pos=0 describes the first chunk of RAM to be operated on, and pos=number_blocks×chunks_per_block−1 is the last chunk.

The memory access structure described in conjunction with FIG. 7 causes accesses to individual pages of randomly ordered blocks, if forced to use flash (e.g., memory 206) instead of RAM (204). This will cause the flash to be cleared with an overwhelming probability, and the pseudo-random access order prevents the adversary from scheduling the memory accesses to avoid this drawback. The cost of a flash-bound computation in comparison to the RAM-bound alternative available to the honest execution of the algorithm is noticeably more time consuming.

In some embodiments, one hash function application is used to generate several invocations of next_string_chunk. This reduces the computational burden associated with the auditing process, which emphasizes the contribution of the memory access in terms of the time to perform the task.

In various embodiments the input to the hash function is a constant number of previous outputs; this complicates storage for a malware agent wishing to reconstitute the state of a given portion of the pseudo-random generator, and is thus useful to further frustrate any attempt to use strategy 2 (compute missing data).

Performing Timing

This section describes an example technique that can be used for timing the execution of auditing tasks. For example, in some embodiments the technique is employed by verifier 106 as described in conjunction with the text corresponding to FIG. 6.

Verifier 106 is configured to time the execution of portions 606 and 610 of the process shown in FIG. 6, e.g., to identify attempts to outsource storage; compute missing data; and outsource computation.

In some embodiments verifier 106 is configured to obtain state information from device 102 at frequent intervals (e.g., that are set by verifier 106). One example of state information is the memory contents of the memory chunk that was last updated, which vouches for that device 102 has reached this stage of the computation. Verifier 106 sends update requests to device 102 at regular intervals. In some embodiments the update requests correspond to updates of the state of the pseudo-random generator used to compute the output of the subroutine next_string_chunk. If the output of the subroutine next_string_chunk is generated by selecting an unused portion from an already generated pseudo-random string, the string can be cleared at the same time, thus forcing the new seed to affect the state immediately.

An evasive program employing adversarial strategy 3 (i.e., outsourcing computation), must transmit the update of the pseudo-random string to the external device that performs the computation, after which the external device has to compute the resulting next value to be reported by device 102 to verifier 106 and transmit this to the evasive program. This incurs a round-trip delay. If the round-trip delay exceeds the time between timing checkpoints, the cheating will be detected.

In various embodiments, the device-specific time between checkpoints is chosen so that there is not enough time to outsource computation using communications equipment (e.g., WiFi) included on device 102, pessimistically assuming congestion-free environments.

The execution time of modify_memory is determined by the parameter selections described above and what hash function to use to compute next_string_chunk. For example, the MD6 hash function can be configured to different output sizes, from 224 to 512 bits. As explained above, in some embodiments a 512-bit version is used. The time per invocation of modify_memory is noticeably less than the time between checkpoints determined above.

Examples of Detecting Various Evasive Programs

The following section provides examples of how evasive programs employing the various strategies described above can be detected using the techniques described herein.

Defending Against Adversarial Strategy 1—Outsource Storage.

Assume an empty SD card has been inserted into device 102. The corresponding write speed could reach up to 5 MB/s. The size of a block processed by modify_memory as described above is chosen, in this example, to be 128 kB. The time to write the data to the SD card would be 25 ms. In comparison, suppose RAM on device 102 has a write speed of 100 MB/s. The corresponding write time would be 1.25 ms. The additional delay can be readily detected. And, if multiple accesses to the SD card are made between two checkpoints, the additional delay will be even more readily detected.

Defending Against Adversarial Strategy 2—Compute Missing Data.

As mentioned above, the pseudo-random string can be computed in a way that cannot be computed using random access. To compute the value of a certain output, the corresponding input needs to be computed from stored data. Since rounds >1, the data stored in RAM is not this needed state, but a combination of the states of the two or more rounds. The state needs to be explicitly stored (in RAM) by the malware agent, as part of its code space, and the needed state computed from this. This forces the malware agent to compute at least (and in fact, much more) than rounds×number_blocks×chunks_per_block hash operations during the execution of portion 610 of the process shown in FIG. 6, in addition to the computation it needs to perform to "legitimate" computation. For the selected parameter choices, that is more than 100 million hash operations. Given an approximate time of 10 μs for computing a hash function invocation, this is about 1000 s, which is approximately 3 orders of magnitude more than the expected and can be detected accordingly.

A sample proof corresponding to the defense against strategy 2 will now be provided. Assume that an evasive program resides in memory 204 and takes up at least portions of some c 32-bit chunks for itself and its variables. A pessimistic assumption can be made that all of this space can effectively be used to store variables, which is not possible, but which gives a lower bound on the amount of work that the malware has to perform to remain undetected. In reality, its effort is greater as not all c chunks can be used for storage, but some are needed to store its code.

For each one of the c hits to RAM chunks that do not contain the values needed to compute the function, the malware agent has to compute the expected contents. It is assumed in this example that the original contents—before the RAM-filling was performed—were zero. If this is not so, the effort of the malware agent would be greater, so making this assumption establishes a lower bound on the effort of the malware agent. To compute the expected updates to this cell that would have been performed by the RAM-filling algorithm, the malware agent needs to compute the values for all the rounds passes on the memory chunk in question. The values XORed in to memory come from a pseudo-random sequence. And, it is only possible to reconstitute the state of the chain in the cell where it is missing by computing the value next_string_chunk from a value that is stored by the malware agent in part of the c chunks of storage. It is assumed that the variables are stored solely in RAM, or the malware agent needs to also succeed with strategy 1 (outsource storage).

As explained above, the pseudo-random generator cannot be computed using a random-access approach. It is the case that L=16 chunks is needed to store a state, given a chunk size of 32 bits and a state size (=MD6 output size) of 512 bits. The malware agent has to recompute the sequence of hash function invocations from a position of RAM associated with this state (which does not have to be where the malware agent stored this state.)

Given the random permutation over cells during the writing of the memory (the order which cannot be anticipated by the malware agent), the expected length of the run to the string position corresponding to the stored state is at least rounds× n/(c/L), where n=number_blocks×chunks_per_block corresponds to the number of chunks that RAM consist of, rounds×n is the length of the pseudo-random string, and where c/L are the number of pseudo-random states stored by the malware agent. Thus, for each hit to a "bad" cell, the malware agent has to perform an expected rounds×n×L/c invocations of next_string_chunk, which corresponds to rounds×n×/c. There are c such hits, not counting hits to "bad" cells that occur as the malware agent attempts to compute one of the expected states. Therefore, the malware agent has to perform at least rounds×n hash operations to compute the contents of the c bad blocks from the stored contents. The approximate time to do this (according to an example implementation) is at least between 100,000-1,000,000 times slower than the legitimate client which indicates that any attempt to compute missing data will be detected.

If the computation of the chain causes the access to a cell that has been used to store a value for another pass of the computation, then this causes another hit to be incurred. It would happen with an approximate probability (c−c/rounds)/c×c/number_blocks=(c−c/number_blocks)/number_blocks≈c/number_blocks for each memory access, and therefore, with approximate probability $1-(1-c/\text{number\_blocks})^{number\_blocks \cdot rounds^2/c}$ for a given first bad cell hit, as described above. A rough approximation of this quantity is $1-e^{-rounds^2}$. For rounds=2, this is more than 98% probability. This additional cost would increase with increasing values of c. An adversary would therefore do best to make c small.

In the following, assume that the adversary uses c=L=16 cells only, all 16 to store one value. With this configuration, the adversary would fail to compute the value (unless using external memory) in those situations where the chain leads in a direction that does not make it possible to compute the value corresponding to the "programcell" from the value in the "storage cell". For rounds=2, this failure occurs with probability 75%. In the remaining 25% of the cases, the adversary would simply be slowed down. (To always succeed to compute the value, the adversary needs to store at least round=2 values, each 512 bits long.

Defending Against Adversarial Strategy 3—Outsource Computation.

In some embodiments the time between checkpoints is chosen so that there is no time to outsource computation using the communications equipment on the device. The time between checkpoints can be chosen by verifier 106 in a way that makes this immediately detectable. A strategy involving outsourcing of computation will fail, as the roundtrip has to be completed between two checkpoints for the right value to be provided by the adversary. This is independent of the speed of communication between the client device and the verifying party.

Defending Against Adversarial Strategy 4—Modify Detection Code.

Suppose unauthorized program 508 corrupts the execution of some steps (e.g., as described in conjunction with FIG. 6), then willingly loads legitimate code and removes itself. Such an adversary could potentially corrupt portions 602 and 604 of the process, but will not be able to corrupt portion 606. Specifically, it needs to corrupt portion 602 of the process (clearing swap space and RAM) in order to maintain active. It can then cause a misreporting of state at 604. However, this will be detected when the keyed hash of the memory contents are computed (610). This is both due to the assumed collision-freeness of the hash function used, and the fact that the key is not disclosed to the device until 608. Portion 608 cannot be corrupted without being active during 606, which in turn would cause detection, as described above. And, the evasive program will be unable to compute the correct values to be reported at 612 without executing portion 606 of the process shown in FIG. 6.

Combinations of the four adversarial strategies will also fail, since each of them will be detected and combinations of them do not change the underlying device-specific limitations.

Additional Processing

Figure 8:
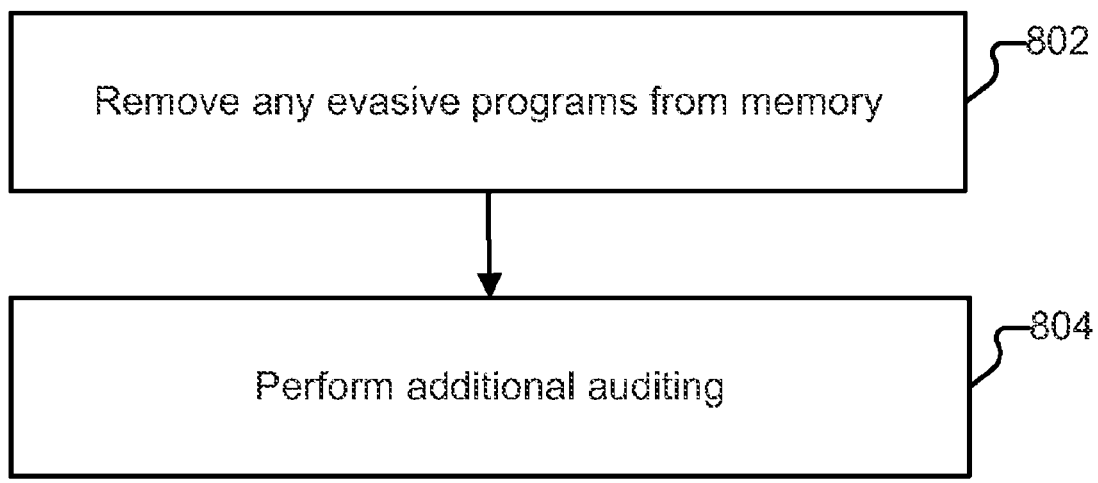
FIG. 8 illustrates an example of a process for performing a device audit.

FIG. 8 illustrates an example of a process for performing a device audit. In various embodiments, the auditing processes described above form one phase (802) of a two (or more) phase process. Once the techniques described above have been employed with respect to a device such as device 102, an assumption can be made that no evasive software is active in the RAM of the device. Arbitrary additional processing can then be performed on the device (804). Examples of additional processing that can be performed are described below.

Example

Malware

After the processing of 802 is performed, at 804, device 102 performs traditional antivirus software to identify known bad software, such as may be stored in memory 206. At 804 device 102 can also be configured to report the entire contents of memory 206 or portions of memory to verifier 106 or to another device.

Example

Jailbreaking

After the processing of 802 is performed, at 804 device 102 determines whether its operating system loader has a particular hash, and/or otherwise determines whether the operating system loader has been altered away from a desirable state.

Example

Phone Unlocking

After the processing of 802 is performed, at 804 device 102 determines whether its operating system loader has been altered and also determines whether any information associated with a service provider has been altered.

Example

Software Piracy

After the processing of 802 is performed, at 804 device 102 determines whether any software included in memory 206 has been modified from an expected configuration, ascertains any associated serial numbers for the software, and/or otherwise determines whether the included software is being used in an unauthorized/unlicensed manner. In some embodiments device 102 reports the contents of memory 206 or portions thereof to verifier 106.

Example

Media Piracy

Suppose that media files (e.g., music, video, or image files) are customized using watermarks during distribution, and that these watermarks are cryptographically authenticated, e.g., using a MAC or digital signature. At 804 it can be determined which files present on device 102 have legitimate watermarks, and whether these contain valid authenticators. The determination can be made either locally to device 102 or centrally (e.g., on verifier 106).

In various embodiments, applications (such as a music player installed on device 102) record usage and other data (forming a log of activity) and associate the information with the appropriate media (e.g., song file). The logs can be read by the verifier 106 at 804.

Example

Chains of Custody/Usage Logs

Suppose an application (or data file) has an associated log file that is used to record transactions. One example is a log file that records the occurrence of financial transactions, including stored-value information. The legitimacy of changes made to the log file can be verified as follows. First, the processing of 802 is performed. Then, at 804 a determination can made (e.g., by comparing hashes of program images) as to whether or not the application (or data file) has been altered, and thus, whether the log file is genuine.

One approach to the processing performed at 804 in this example is as follows: First, memory 206 is scanned and a list of applications and data files associated with the applications is created. Next, a list of descriptors for the applications and data files is determined. An example of a descriptor is a hash of the file, along with the name and type of file, and an identifier stating what string sequence(s) it matched. Next, a second list of any descriptions of applications or data that is not already reported on in the first list is made. The description created here may include all or parts of the code for an application, or of a description of what type of input files it processes and output files it produces. The second list is transmitted to an external party, such as verifier 106, where it is verified. The second list can also be processed locally using any policy obtained from a policy verification server.

The outcome of the verification can be used to affect the permissions to the applications and data, and can be used to control how external servers interact with the device, including whether it is granted access to network resources (such as the Internet, 3G networks, corporate networks, etc.). As another example, the software allowed to run on the device can be restricted, and notify the user of lack of compliance, attempt to remove or repair or otherwise modify files, etc.

Example

Parental Control Filters and other Monitoring Features

After the processing of 802 is performed, in various embodiments, additional middleware is installed that can be configured to log (and/or block) various events associated with the device. Examples include:

(a) determining what photos was generated on the device and later transmitted out? (e.g., to prevent "sexting").

(b) determining (e.g., based on device activity and GPS changes) whether the device was used (e.g., for texting or watching video clips) while travelling at a speed greater than 20 miles per hour.

(c) determining (e.g., based on installation activity) whether alternative applications (such as a second instant messaging program in addition to a default program) has been installed, and then creating a log file for the alternative application.

(d) determining (e.g., based on browser history information) what URLs a user has visited including which URLs were manually navigated to and which URLs were referred to in other HTML documents that were accessed. One benefit of this logging is to identify whether a person is likely to have fallen victim to phishing; has visited a web site known to distribute unwanted content, including malware; and whether the device is likely to be involved in click-fraud. Such abuse is possible to achieve without infection of the device itself, e.g., by use of JavaScript, cascading style sheets, and/or other related scripting languages.

Preserving Privacy

In some embodiments descriptions of all state (e.g., the contents of memory 204) is communicated to the verifier 106. However, some data should preferably not be transferred off device 102, such as private keys and non-executable private data. In the following section, techniques preserving the privacy of such data are described.

Assume that a first random number is called x, and that it is selected from some space of possible values, 1 . . . max-x. It is possible that x encodes malware apart from providing an input to the auditing process for which it was intended. A legitimate program computes a one-way function value y from the input data x and some system parameters, which is called $(g_1, n_1)$. One example way of doing this is by computing $y = g_1^x$ modulo $n_1$, where $g_1$ generates a large subgroup of $G_{\{n1\}}$.

Let the program then compute a second one-way function value z from the value y and some system parameters, which is called $(g_2, n_2)$. One example way of doing this is by computing $z = g_2^y$ modulo n2, where $g_2$ generates a large subgroup of $G_{\{n2\}}$.

Next, it is assumed that the client machine proves (e.g., using a zero-knowledge proof) that there is a value x such that $z = g_2^{g_1^x \bmod n_1}$ modulo n2, where (z, $g_1$, $g_2$, $n_1$, $n_2$) are known by the verifier, but (z,x) are not. The device (the "prover") then erases the value x but stores (y,z) and the parameters ($g_1$, $g_2$, $n_1$, $n_2$).

At later times, the device has to prove that the value y that it stores, but which is secret, corresponds to the value z. (Here, z may be stored on device 102, but can also be stored by verifier 106.) One example proof that can be used is a zero-knowledge proof.

If the second proof concludes and verifier 106 accepts it, then the verifier knows that the unknown value z that the client stores is of a format that cannot be used to hide a significant amount of data of value to a malware agent.

Here, z may be used to encrypt some other data, which is referred to as m, and whose ciphertext is referred to as c. Thus, $c = E_z(m)$ for an encryption algorithm E. Assuming symmetric encryption, $m = D_z(c)$ for some decryption algorithm D. The device contents can be verified, but m remains unknown by the party receiving c. This party would not know z, but only that z is of some acceptable form that cannot hide large amounts of malware data. Since the auditing process described herein allows the verifier party to be assured that only legitimate programs exist in the RAM of the client device, it can be known that the programs—using the secret value z—can access m, given c. However, the verifier cannot.

Since it is known that the accessing program is legitimate, it is also known that m will only be accessed in an approved manner. For example, if m is data and not code, then it is the case that the accessing program will not try to execute the data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a physical memory; and
    a hardware processor configured to:
        receive one or more hardware parameters that correspond to a hardware configuration, wherein the hardware parameters include at least one of an amount and a speed of the physical memory;
        perform a sequence of modifications to the physical memory, wherein the sequence of modifications includes at least one write operation; and
        provide results to a verifier.

2. The system of claim 1 wherein the verifier is configured to determine, based at least in part on the received results, whether an expected sequence of physical memory modifications was made by the processor.

3. The system of claim 2 wherein the determination is based at least in part on timing information associated with the performance of the sequence of modifications.

4. The system of claim 2 wherein the determination is based at least in part on the correctness of a result received from a device.

5. The system of claim 1 wherein the verifier is collocated on a device with the processor.

6. The system of claim 5 wherein the verifier is included in a subscriber identity module.

7. The system of claim 1 wherein the verifier is in communication with the processor via a network connection.

8. The system of claim 1 wherein the processor is further configured to obtain a seed from the verifier.

9. The system of claim 1 wherein the sequence of modifications depends at least in part on an input obtained from the verifier.

10. The system of claim 1 wherein the processor is configured to perform a scan once it is determined that no evasive software is active in the physical memory.

11. The system of claim 10 wherein the scan comprises a scan for unlicensed software.

12. The system of claim 1 wherein the memory includes secret data and wherein providing results to the verifier does not compromise the secret data.

13. The system of claim 1 wherein the processor is included in a mobile phone.

14. A method, comprising:
    receiving one or more hardware parameters that correspond to a hardware configuration, wherein the hardware parameters include at least one of an amount and a speed of a physical memory;
    performing, using a hardware processor, a sequence of modifications to the physical memory, wherein the sequence of modifications includes at least one write operation; and
    providing results to a verifier.

15. The method of claim 14 wherein the verifier is configured to determine, based at least in part on the received results, whether an expected sequence of physical memory modifications was made.

16. A computer program product embodied in a non-transitory computer readable storage medium and comprising computer instructions for:
    receiving one or more hardware parameters that correspond to a hardware configuration, wherein the hardware parameters include at least one of an amount and a speed of a physical memory;
    performing a sequence of modifications to the physical memory, wherein the sequence of modifications includes at least one write operation; and
    providing results to a verifier.

17. A system, comprising:
    a hardware processor configured to:
        receive from a device one or more results associated with a performance by the device of a sequence of modifications to a memory included on the device, wherein the sequence of modifications includes at least one write operation;
        determine that the one or more results indicates that the memory included on the device is free of evasive software, wherein the determination is based at least in part on one or more hardware parameters associated with the device, wherein the hardware parameters include at least one of an amount and a speed of the memory included on the device; and
        initiate a scan of the device after the determination is made; and
    a memory coupled to the processor and configured to provide the processor with instructions.

18. A system, comprising:
    a hardware processor configured to:
        initiate a request that a device determine a result;
        receive the result from the device, wherein the result is associated with a performance by the device of a sequence of modifications to a memory included on the device, wherein the sequence of modifications includes at least one write operation; and
        determine a security state of the device, wherein the determination is based at least in part on the result, a length of time that it takes the device to provide the result, and one or more hardware parameters associated with the device, wherein the hardware parameters include at least one of an amount and a speed of the memory included on the device; and a memory coupled to the processor and configured to provide the processor with instructions.

* * * * *